(12) United States Patent
Waldvogel et al.

(10) Patent No.: US 6,823,394 B2
(45) Date of Patent: Nov. 23, 2004

(54) METHOD OF RESOURCE-EFFICIENT AND SCALABLE STREAMING MEDIA DISTRIBUTION FOR ASYNCHRONOUS RECEIVERS

(75) Inventors: Marcel Waldvogel, St. Louis, MO (US); Lihao Xu, Clayton, MO (US); Ramaprabhu Janakiraman, St. Louis, MO (US)

(73) Assignee: Washington University, St. Louis, MO (US)

( * ) Notice: Subject to any disclaimer, the term of this patent is extended or adjusted under 35 U.S.C. 154(b) by 847 days.

(21) Appl. No.: 09/735,017

(22) Filed: Dec. 12, 2000

(65) Prior Publication Data

US 2002/0107969 A1 Aug. 8, 2002

(51) Int. Cl.[7] ............................................... G06F 13/00
(52) U.S. Cl. ....................................................... 709/231
(58) Field of Search ................................. 725/105, 118, 725/86, 87, 91, 92, 93, 94; 719/322; 709/200, 217, 218, 219, 227, 230, 231, 232, 246; 707/100, 104.1

(56) References Cited

U.S. PATENT DOCUMENTS

| | | |
|---|---|---|
| 5,442,390 A | 8/1995 | Hooper et al. |
| 5,606,359 A | 2/1997 | Youden et al. |
| 5,751,336 A | 5/1998 | Aggarwal et al. |
| 5,781,227 A | 7/1998 | Goode et al. |
| 5,815,662 A | 9/1998 | Ong |
| 5,928,330 A | 7/1999 | Goetz et al. |
| 5,933,603 A | 8/1999 | Vahalia et al. |
| 5,935,206 A | 8/1999 | Dixon et al. |
| 5,936,659 A | 8/1999 | Viswanathan et al. |
| 5,964,829 A | 10/1999 | Ozden et al. |
| 5,969,763 A | 10/1999 | Sakamoto |
| 5,973,680 A | 10/1999 | Ueda |
| 6,032,200 A | 2/2000 | Lin |
| 6,047,317 A | 4/2000 | Bisdikian et al. |
| 6,057,832 A | 5/2000 | Lev et al. |
| 6,085,221 A | 7/2000 | Graf |
| 6,091,455 A | 7/2000 | Yang |

OTHER PUBLICATIONS

Hua et al., Skyscraper Broadcasting: A New Broadcasting Scheme for Metropolitan Video–on–Demand Systems, USA,–undated–.

Gao et al., Efficient Schemes for Broadcasting Popular Videos, USA.

Eager et al., Dynamic Skyscraper Broadcasts for Video–on–Demand, Multimedia Information Systems, Sep. 1998, USA,–undated–.

Masnick, et al., On Linear Unequal Error Protection Codes, IEEE Transactions on Information Theory, Oct. 1967, pp. 600–607, vol. IT–3, No. 4, USA.

Albanese et al., Priority Encoding Transmission, IEEE Transactions on Information Theory, Nov. 1996, pp. 1737–1744, vol. 42, No. 6, USA.

*Primary Examiner*—Robert B. Harrell
(74) *Attorney, Agent, or Firm*—Senniger Powers

(57) ABSTRACT

A method of distributing streaming media to one or more users. The method includes partitioning the media into segments that each include data associated with at least a portion of one or more of the successive data units in the media. Each segment also includes information for positioning the data relative to the order of the data units. A transmission sequence having a plurality of successive time slots is defined for the segments to enable reconstruction of an i-th data unit from $L_i$ segments. A server transmits each of the segments according to the defined transmission sequence during one of the time slots. A client processes the transmitted segments based on the positioning information to reconstruct the media.

31 Claims, 6 Drawing Sheets

ORIGINAL DATA UNITS

ENCODED DATA SEGMENTS

RECONSTRUCTED DATA UNITS

ORIGINAL DATA UNITS

ENCODED DATA SEGMENTS

RECONSTRUCTED DATA UNITS

FIG. 4A

Initial delay d=0

| S | Transmission time → |
|---|---|
| | 1 2 3 4 5 6 7 8 9 10 11 12 13 14 15 16 17 18 19 20 21 22 23 24 25 26 27 28 29 30 |
| 1 e | x x x x x x x x x x x x x x x x x x x x x x x x x x x x x x |
| 2 g | x x x x x x |
| 3 m | x x x x |
| 4 e | x x x |
| 5 n | x x x x x |
| 6 t | x x x |
| 7 | x x |
| 8 n | x x x x |
| 9 u | x x x |
| 10 m | x x x |
| 11 b | x x x |
| 12 e | x x x |
| 13 r | x x x |
| 14 s | x x x |
| 15 - | x x |
| 16 - | x x |
| 17 → | x x |

| TIME SLOT | FRAME 1 | FRAME 2 | FRAME 3 | FRAME 4 | FRAME 5 | |
|---|---|---|---|---|---|---|
| 1 | ALL | 1ST HALF | 1ST THIRD | 1ST QUARTER | 1ST FIFTH | ⋮ |
| 2 | ALL | 2ND HALF | 2ND THIRD | 2ND QUARTER | 2ND FIFTH | ⋮ |
| 3 | ALL | 1ST HALF | 3RD THIRD | 3RD QUARTER | 3RD FIFTH | ⋮ |
| 4 | ALL | 2ND HALF | 1ST THIRD | 4TH QUARTER | 4TH FIFTH | ⋮ |
| 5 | ALL | 1ST HALF | 2ND THIRD | 1ST QUARTER | 5TH FIFTH | ⋮ |
| 6 | ALL | 2ND HALF | 3RD THIRD | 2ND QUARTER | 1ST FIFTH | ⋮ |
| 7 | ALL | 1ST HALF | 1ST THIRD | 3RD QUARTER | 2ND FIFTH | ⋮ |
| 8 | ALL | 2ND HALF | 2ND THIRD | 4TH QUARTER | 3RD FIFTH | ⋮ |
| 9 | ALL | 1ST HALF | 3RD THIRD | 1ST QUARTER | 4TH FIFTH | ⋮ |
| 10 | ALL | 2ND HALF | 1ST THIRD | 2ND QUARTER | 5TH FIFTH | ⋮ |
| 11 | ALL | 1ST HALF | 2ND THIRD | 3RD QUARTER | 1ST FIFTH | ⋮ |
| 12 | ALL | 2ND HALF | 3RD THIRD | 4TH QUARTER | 2ND FIFTH | ⋮ |
| 13 | ALL | 1ST HALF | 1ST THIRD | 1ST QUARTER | 3RD FIFTH | ⋮ |
| 14 | ALL | 2ND HALF | 2ND THIRD | 2ND QUARTER | 4TH FIFTH | ⋮ |
| 15 | ALL | 1ST HALF | 3RD THIRD | 3RD QUARTER | 5TH FIFTH | ⋮ |
| 16 | ALL | 2ND HALF | 1ST THIRD | 4TH QUARTER | 1ST FIFTH | ⋮ |
| ⋮ | | | | | | |
| 200000 | ALL | 2ND HALF | 2ND THIRD | 4TH QUARTER | 5TH FIFTH | ⋮ |

METHOD OF RESOURCE-EFFICIENT AND SCALABLE STREAMING MEDIA DISTRIBUTION FOR ASYNCHRONOUS RECEIVERS

BACKGROUND OF THE INVENTION

The invention relates generally to transmitting data, including video and audio data, and, particularly, to a method of resource-efficient and scalable streaming media distribution for asynchronous receivers.

Continuous streaming media is emerging as an increasingly popular data delivery form for many applications, such as entertainment, distance learning, news delivery, and the like. Streaming data, however, usually consumes a great deal of resources, including server computation and I/O power, network bandwidth, and user buffer space. Thus, with the increasing popularity of such streaming media services, high load becomes a threat to both the servers involved and the network, especially close to the servers.

For example, many users will request popular data, such as a blockbuster movie, in a short time period. If the data stream is delivered using unicast, then the load on server and the load on network are both roughly proportional to the number of users during the play out time period. Further to the example, if 1000 users request a high quality two-hour video in a short time, then the total network bandwidth consumed ranges from 3 Gbps to 8 Gbps because a single typically unicast needs a network bandwidth of 3 Mbps to 8 Mbps. Not only is the necessary bandwidth extremely expensive, the server's load is roughly 1000 times of one unicast load. So it becomes more economical, both for the server and the network, to multicast the data to a group of users requesting the same data using multicast mechanisms and broadcast transmitters (e.g., terrestrial or geostationary). Because both the server load and the network bandwidth consumption are roughly the same as those for one unicast delivery, multicast is particularly suitable for delivering data to a large group of users.

Unfortunately, multicast only works well for synchronous users, i.e., the users have to join the multicast group at the same time in order to share the same data stream. The users are limited to receiving the data transmission at predefined times so they will miss the beginning, or even the entire transmission, if they join late. For most applications, however, users usually request the same streaming data at different times, i.e., user data requests are usually asynchronous. One technique to resolve this problem is to periodically multicast the same data stream and exploit the users' buffer space to synchronize their data reception. The shortcoming of this kind of scheme is of course a delay of data delivery to the users. A trade-off between the data delay and resources (server, network and user buffer space) has to be made. For example, if a two-hour video is multicast every 10 minutes, then the resources consumption is about 12 times as that for one unicast. But if the initial delay is reduced to one minute, then the resources consumption increases another 10-fold. Another disadvantage of a multicast is the relatively high cost of implementing a reliable multicast channel over a generally unreliable physical communication media. If different receivers in a multicast group lose different data packets, the sender has to resend them either using unicasts or multicast.

For these reasons, an efficient and scalable method of providing streaming media for asynchronous receivers is desired. To exploit the efficiency and scalability of multicast and solve the inherent problems with multicast transmissions, an improved data streaming scheme using multicast, based on error control codes is also desired.

The following patents, the entire disclosures of which are incorporated herein by reference, disclose various aspects of streaming media delivery: U.S. Pat. Nos. 5,936,659 and 5,751,336 relate to pyramid broadcasting transmission schemes; U.S. Pat. Nos. 5,606,359 and 5,442,390 disclose video-on-demand hardware; U.S. Pat. No. 6,047,317 relates to interactive television navigation; U.S. Pat. No. 5,781,227 relates to fading between media streams; U.S. Pat. No. 6,091,455 discloses a statistical multiplexer for recording video; U.S. Pat. No. 6,085,221 relates to equalizing bandwidth; U.S. Pat. No. 6,057,832 discloses dual stream video-on-demand; U.S. Pat. Nos. 5,973,680 and 5,969,763 relate to buffering; U.S. Pat. Nos. 5,964,829 and 6,032,200 relate to playout scheduling; U.S. Pat. No. 5,935,206 discloses automatic replication of digital video for video-on-demand; and U.S. Pat. No. 5,933,603 relates to server caching.

SUMMARY OF THE INVENTION

The invention meets the above needs and overcomes the deficiencies of the prior art by providing an improved method of streaming media for asynchronous receivers. Among the several objects and features of the present invention may be noted the provision of such method that permits multicasting a single data stream, which is an encoded form of the original data; the provision of such method that permits a user to join the multicast group at any time during the data transmission period; the provision of such method that permits the user to play out the data from its beginning after a small fixed time delay; the provision of such method that consumes resources at a rate proportional to that for a single unicast of the original data; and the provision of such method that is economically feasible and commercially practical.

Briefly described, a method of distributing streaming media to one or more users embodies aspects of the present invention. The method includes the step of partitioning the media into a plurality of segments. Each segment has data associated with at least a portion of one or more of the data units. The media has a plurality of successive data units in a predefined order and each segment further includes information for positioning the data relative to the order of the data units. The method also includes defining a transmission sequence for the segments having a plurality of successive time slots. In turn, the sequence enables reconstruction of an i-th data unit from $L_i$ segments. The method further includes the steps of transmitting the segments according to the transmission sequence, each segment being transmitted during one of the time slots, and processing the transmitted segments based on the positioning information to reconstruct the media.

In another embodiment, the present invention is directed to a method of distributing streaming media to one or more users. The method includes the step of partitioning the media into a plurality of segments. Each segment has data associated with at least a portion of one or more of the data units. The media has a plurality of successive data units in a predefined order and each segment further includes information for positioning the data relative to the order of the data units. The method also includes defining a transmission sequence for the segments having a plurality of successive time slots. The sequence includes data associated with an i-th data unit at least every $L_i$ time slots. The method further includes the steps of transmitting the segments according to the transmission sequence, each segment being transmitted during one of the time slots, and processing the transmitted segments based on the positioning information to reconstruct the media.

Yet another embodiment of the invention is directed to a method of distributing streaming media to one or more users. The method includes the step of partitioning the media into one or more subunits. This step includes partitioning an i-th data unit into $m_i$ subunits, where $i \geq 1$ and $m_i \geq 1$. The method also includes assigning data associated with at least one subunit of each data unit to each of a plurality of segments. Each segment has data associated with at least a portion of one or more of the data units as well as information for positioning the data relative to the order of the data units. The method includes the step of defining a transmission sequence for the segments having a plurality of successive time slots. In turn, the sequence enables reconstruction of an i-th data unit from $L_i$ segments. The method further includes the steps of transmitting the segments according to the transmission sequence, each segment being transmitted during one of the time slots, and processing the transmitted segments based on the positioning information to reconstruct the media.

Alternatively, the invention may comprise various other methods and systems.

Other objects and features will be in part apparent and in part pointed out hereinafter.

BRIEF DESCRIPTION OF THE DRAWINGS

FIGS. 4A and 4B illustrate an exemplary transmission sequence according to a preferred embodiment of the invention.

FIG. 5 illustrates an exemplary transmission sequence according to another preferred embodiment of the invention.

Corresponding reference characters indicate corresponding parts throughout the drawings.

DETAILED DESCRIPTION OF PREFERRED EMBODIMENTS

Figure 1:
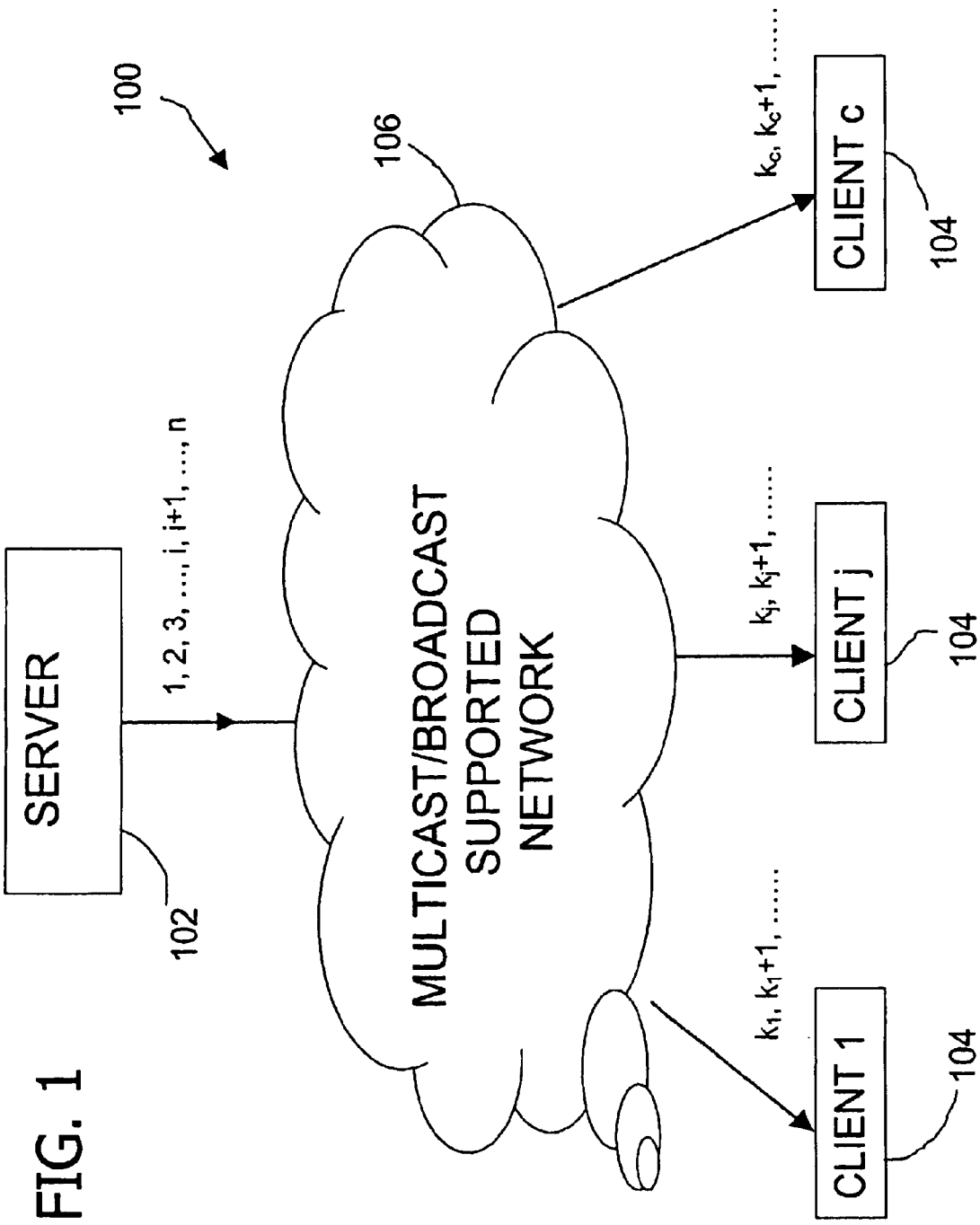
FIG. 1 is a block diagram of a system for distributing streaming media to a plurality of asynchronous users according to a preferred embodiment of the invention.

Referring now to the drawings, FIG. 1 illustrates a system 100 embodying aspects of the present invention. The system 100 preferably includes a server 102 connected to one or more clients 104 via a network 106. In this embodiment, the network 106 is a multicast/broadcast supported network. For simplicity, three clients 104 are shown.

In operation, server 102 distributes streaming media to one or more users associated with clients 104. The media preferably includes strings of data made up of a plurality of successive data units having a predefined order. One example of media typically transmitted via a broadcast network is a movie, which includes a number of frames (e.g., on the order of 200,000). When transmitting video, a high enough frame rate has to be accomplished to produce satisfactorily smooth motion. North American television viewers are used to a rate of 30 frames per second, which means the receiver must access, decompress, and display a new image every 30–40 milliseconds. At any slower rate, the motion will seem slow or jerky. The server 102 first partitions the media into a plurality of segments. Each segment (e.g., a data packet) includes data associated with at least a portion of one or more of the data units as well as information for positioning the data relative to the order of the other data units. In FIG. 1, server 102 partitions the media into m data segments.

After partitioning the media for transmission, server 102 defines a transmission sequence for the segments that enables the data units to be reconstructed in the desired order. In a preferred embodiment of the invention, server 102 transmits the data associated with an i-th data unit at least every $L_i=(d+bi)$ segments when operating in accordance with the defined transmission sequence. As described in detail below, d is a delay measured in segments and b is a bandwidth factor, which is a function of the delay d and a user storage space S.

The transmission sequence defined by server 102 enables the i-th data unit to be reconstructed from $L_i$ segments. The server 102 then transmits the segments in their respective time slots according to the transmission sequence. Upon reception by client 104, the transmitted segments are processed based on the positioning information to reconstruct the media. Advantageously, the present invention permits asynchronously playing out the reconstructed media in response to a command from the user. For example, the first client 104 receives data segments $k_j$, $k_j+1$, and so forth; the j-th client 104 receives data segments $k_j$, $k_j+1$, and so forth; and the c-th client 104 receives data segments $k_c$, $k_c+1$, and so forth. In other words, the data segments received by each client 104 are independent of each other with respect to the position of the data segments relative to the order of the media.

Figure 2:
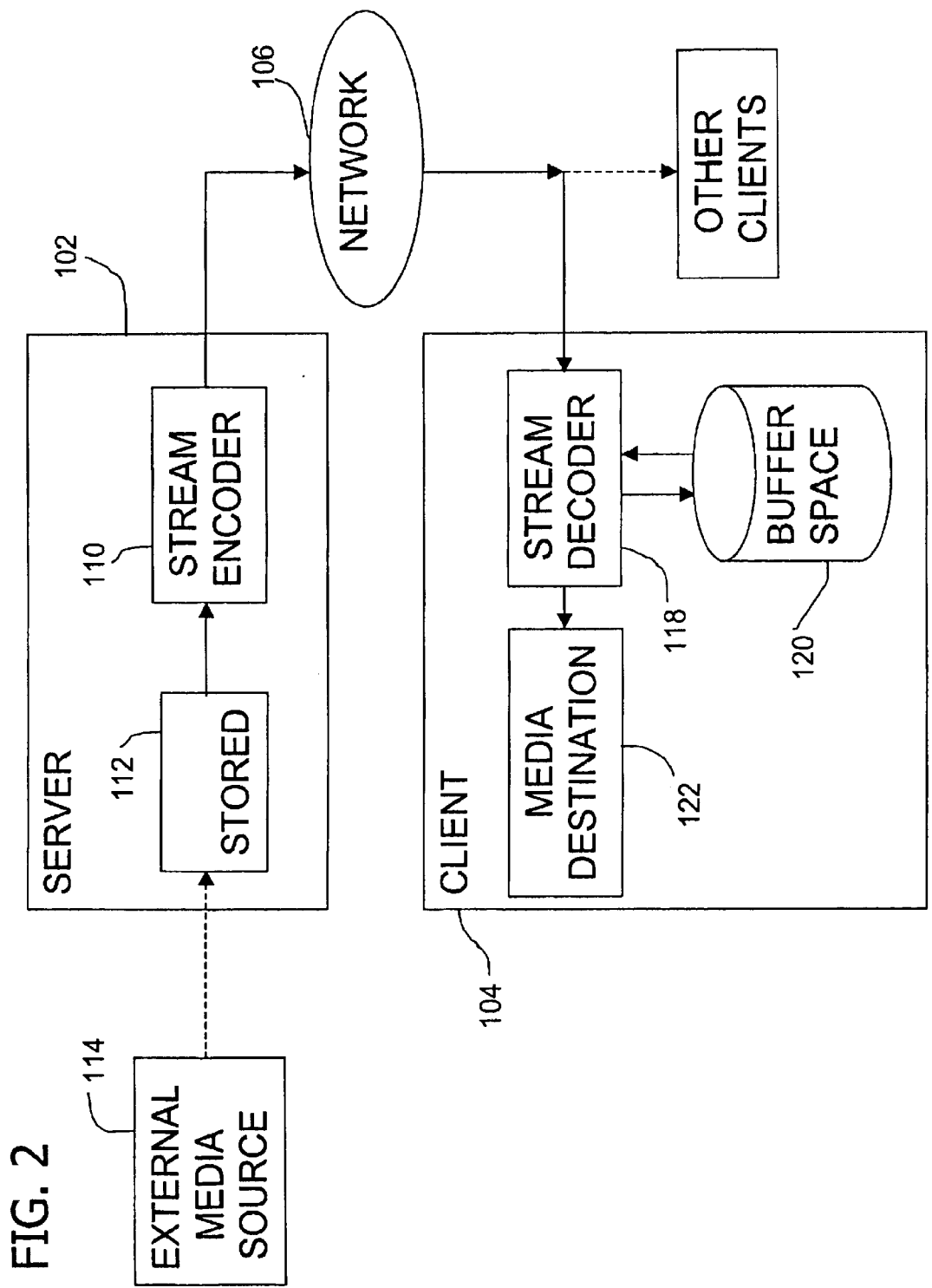
FIG. 2 is a block diagram of a server and a client of the system of FIG. 1.

Referring now to FIG. 2, server 102 preferably includes a stream encoder 110 for encoding stored data 112 and/or data from an external media source 114. Server 102 transmits the encoded data to clients 104 via network 106. As shown, client 104 receives the encoded data via a stream decoder 118, stores and retrieves data from storage 120, and outputs decoded data to a media destination 122 (e.g., a screen display, audio speaker, or other data consumer).

Figure 3:
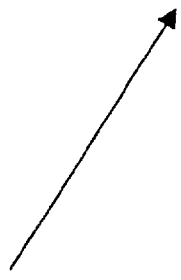
FIG. 3 is a schematic diagram of an original data stream and its corresponding encoded data stream transmitted by the system of FIG. 1.
Figure 3:
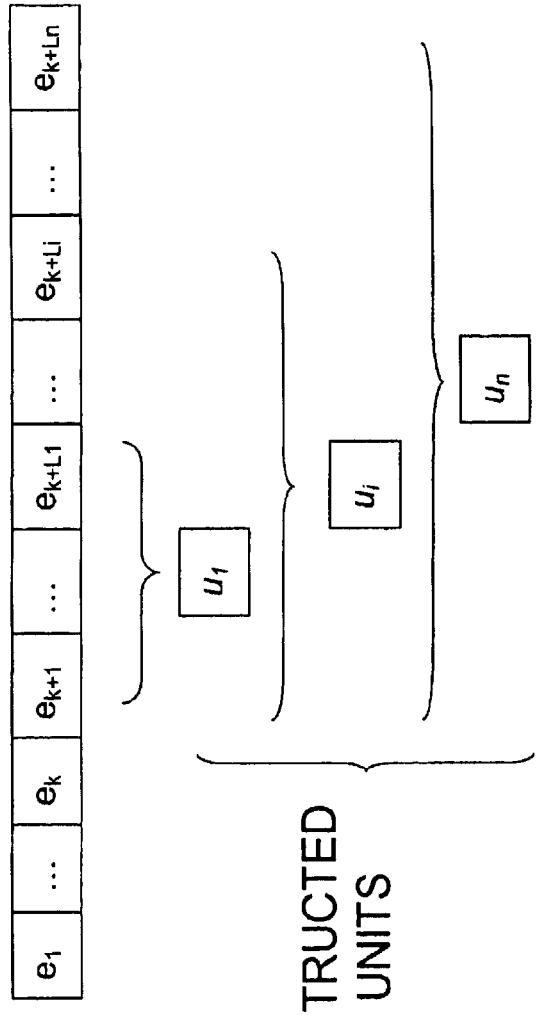

FIG. 3 diagrammatically illustrates the original and encoded data. As described in detail below, the stream encoder of server 102 encodes the n data units of the original data stream to produce a stream of encoded data segments. The stream decoder 118 of each client 104, upon receiving data segments beginning with k+1, reconstructs an i-th data unit of the original data stream from $L_i$ encoded data segments.

The system 100 according to the present invention permits a user to essentially just start receiving data streams (e.g., by tuning to a given satellite or broadcast channel or by joining a network multicast group) instead of requiring interaction with the server or a proxy. In other words, the present invention permits asynchronously playing out the reconstructed media in response to a command from the user. Then, the receiver (i.e., client 104) can reconstruct data on its own for timely playout to the user. To make for a timely playout, the following conditions are preferably met:

1. Playout has to start within D time steps, where a time step is taken as a natural presentation unit, e.g., the time required to display a single data unit such as a video frame. This startup delay is a settable parameter with impact on the user's perception of the system responsiveness and thus quality.

2. Data unit number i is to be played out in time step i+D.

3. Thus, data unit i has to be completely reconstructed before time i+D, imposing lower limits on the transmission and processing speed.

The following discussions will assume constant length of the data units and no losses, except where noted otherwise. Also, data units are numbered starting at 1. Each segment will contain the information needed to reconstruct a single data unit.

In one preferred embodiment, the storage 120 at client 104 (i.e., the receiver) provides generous buffering capabilities. Thus, a fairly straightforward solution would be for server 102 (i.e., the sender) to transmit data unit i as a segment every i+D' time slots, with D'+$p_r$≦d, where $p_r$ is the receiver's per-segment and per-data unit processing overhead. The receiver is able to then buffer every segment containing data unit i received, for which i≧f, where f is the current data unit being played out. For playout, the data units are retrieved from the buffer.

The average transmission rate required to transmit media consisting of n data units is λ times the amount required for a single "normal" transmission, where $$\lambda = \sum_{i=1}^{k} \frac{1}{i+D'} = H(n+D') - H(D') \approx \ln\frac{n+D'}{D'}$$

with H (·) as the harmonic series. The approximation is applicable for large series. For example, a movie which runs 120 minutes at 30 frames per second results in n=216,000. To get a feel for the performance of this scheme, minimal startup delay (D'=0) gives λ≈ln216,000≈12.88, whereas a one second delay (D'=30) yields λ≈ln(216,000/30)≈8.88. This scheme becomes therefore practical when it can be expected that at least λ receivers are interested in receiving the particular multimedia stream.

Although the simplicity and elegance of this basic scheme make it very attractive, the present invention provides even further improvements. For example, if λ as the average transmission rate, the actual transmission rate may be very spiky and, thus, impractical for many current networks. The following describes further aspects of a method of resource-efficient and scalable streaming media distribution for asynchronous receivers to remedy this and other problems with the prior art.

As mentioned above, the burstiness of the traffic is a major hurdle for the practicability of the basic scheme. At time t, all the segments corresponding to data units fulfilling t mod i=0 are played, i.e., those data units evenly dividing the current playout time. Prime numbered time slots (mod gcd(1, . . . , n)) yield just two segments to be sent, while highly composite numbers result in many segments to be transmitted in a single time slot, with the worst case of all segments being transmitted occurring at time 0 (mod gcd(1, . . . , n)). Although mechanisms to provide online smoothing of streaming video have been proposed, the extreme spikiness of the traffic calls for a solution that is tuned to the playout mechanism.

The parameter D (delay measured in time required to play out a single media data unit) is a function of d (delay measured in time required to transmit a single segment), λ, and b, the bandwidth factor (described below). It is possible to shift the transmission time of a given segment to one of the neighboring time slots. Delaying the frame by δ data unit times increases the necessary startup to max {$δ_t$}. Advancing the segment by δ data unit times raises this segment's (local) transmission frequency from 1/bi to 1/b(i−d), increasing the overall bandwidth (b is a bandwidth factor as explained later). To make the playout as smooth as possible, the algorithm prefers to have as many time slots available as possible. Given the above description of the shifting effects, forward shifts are limited by a constant value, backward shifts by a function of the data unit's number.

One preferred embodiment of the present invention provides further bandwidth efficiency by identifying and eliminating the transmission of duplicative data segments. Under normal circumstances, even receivers that have advanced into the media (e.g., a movie) keep getting the segments corresponding to the initial data units at a relatively high frequency, unnecessarily consuming bandwidth. It is therefore desirable that each receiver explicitly deregister their interest for these frames with the multicast infrastructure, if the multicast infrastructure is capable of doing that. If the multicast infrastructure only supports a coarse subscription granularity, this can be achieved by splitting the transmission into α channels of segments corresponding to data units, with α typically being a relatively small integer. Each receiver is initially subscribed to all α channels and is "pruned" out of each channel as soon as it advances and loses interest in that channel.

With respect to optimal splitting of data units into multicast channels, system 100 preferably permits splitting n data units (e.g., frames) into α channels or groups so that the overall network use (for a single client) is minimized. Consider putting channel boundaries at $x_1, x_2, \ldots, x_{α-1}$. That is, Group 1 contains frames 1 . . . $x_1$, Group 2 contains frames $x_1+1 \ldots x_2$, etc. The average bandwidth used is given by:

$$y = x_1\log(n) + (x_2 - x_1)\log\left(\frac{n}{x_1}\right) + \ldots + (x_k - x_{k-1})\log\left(\frac{n}{x_{k-1}}\right) + (x_{k+1} - x_k)\log\left(\frac{n}{x_k}\right) + \ldots + (n - x_{α-1})\log\left(\frac{n}{x_{α-1}}\right)$$

(1)

Differentiating partially with respect to $x_k$ and equating to 0 for minimum bandwidth, using recursion:

$$\frac{\partial b}{\partial x_k} = \log\left(\frac{n}{x_{k-1}}\right) - \frac{x_{k+1} - x_k}{x_k} - \log\left(\frac{n}{x_k}\right) = 0 \quad (2)$$

Or $$x_{k+1} = x_k\left(1 + \log\left(\frac{x_k}{x_{k-1}}\right)\right) \quad (3)$$

Descending recursively, the first boundary $x_1$ may be determined by the equation, $$n = x_1(1+\log(x_1))(1+\log(1+\log(x_1))) \ldots \text{(αterms)} \quad (4)$$

This equation can be numerically solved by iteration (e.g., Newton-Raphson iteration) to obtain the value of $x_1$. Once $x_1$ is found, higher boundaries are obtained using equation (3).

For example, n=120 minutes×60 seconds×30 data units/second and α=3 gives $x_1$=6705, $x_2$=65684 for an average bandwidth utilization of just 65 data units per second as compared to 368 data units per second without pruning. In the case of optimal bandwidth utilization, where each frame is transmitted in its own channel, the average bandwidth drops to 1.

Figure 4B:
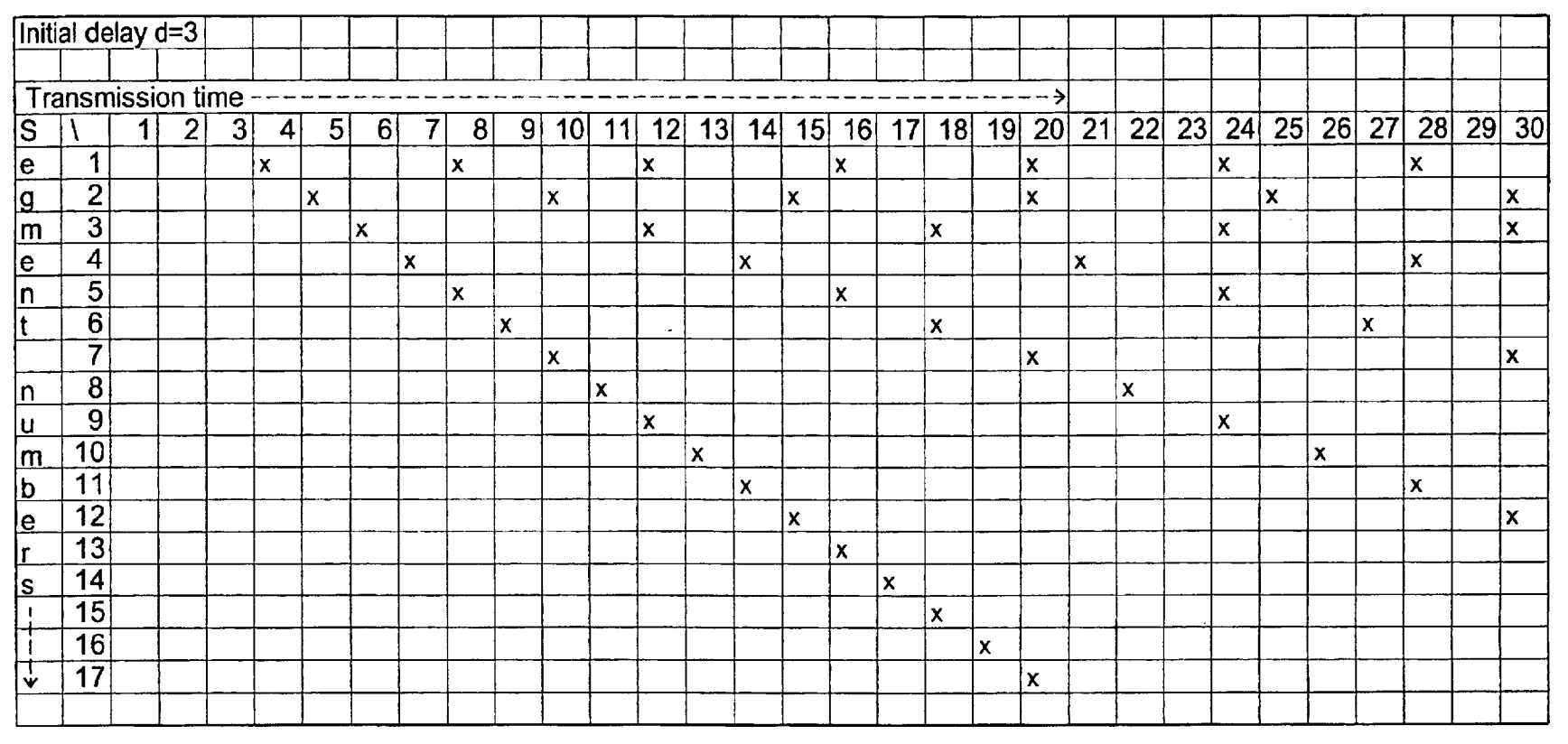

FIGS. 4A and 4B illustrate an exemplary transmission sequence according to a preferred embodiment of the invention, first without an initial delay and then with an initial delay of three segments. FIG. 5 illustrates an exemplary transmission sequence according to another preferred embodiment of the invention. As shown in these figures, the user can begin reception at any time during the transmission sequence, independently of what other user might be doing. A "rewind" feature is also contemplated to permit returning to an earlier data unit of the reconstructed media in response to a command from the user.

In FIGS. 4A and 4B, server 102 defines each data segment to include data associated with one or more of the original data units. For example, at time slot number 10, server 102 transmits the data segment including data for the first, second, fifth, and tenth data units of the original data stream (no delay) or data for the second and seventh data units of the original data stream (d=3).

FIG. 5 illustrates an alternative embodiment of the invention in which server 102 partitions each data unit into one or more subunits. The i-th data unit is preferably partitioned into $m_i$ subunits, where $i \geq 1$ and $m_i \geq 1$. In this embodiment, the transmission sequence assigns data associated with at least one subunit of each data unit to each of the segments. For example, server 102 partitions the fifth data unit, such as a frame of a 200,000 frame movie, into five subunits and transmits each subunit every fifth time slot. In other words, each data segment in this example includes all of the data associated with the first frame, one half of the data associated with the second frame, one third of the data associated with the third frame, and so forth.

In a preferred embodiment of the invention, system 100 employs an Unequal Error Protection (UEP) code. Unlike conventional error control codes, for a UEP code, certain data symbols of its codeword are protected against a greater number of errors (or erasures) than other data symbols. Thus, different data symbols of a UEP's codeword have different error protection degrees. In this instance, a data symbol may be a general data unit of certain size (e.g., a bit, a byte, a packet or a frame). The error protection degree of a data symbol in a codeword is preferably measured by the maximum number of the errors and/or erasures the codeword can tolerate to retrieve this symbol. Equivalently, the minimum number of data symbols needed to retrieve a data symbol in a codeword can also be used to measure the error protection degree of the particular data symbol. For a message M having n data symbols, if the error protection degree of its i-th symbol is $L_i (1 \leq i1 \leq n)$, and it is encoded by a UEP code C of N symbols, then any $L_i$ symbols of its codeword are sufficient to retrieve the i-th symbol in the original message. If $L_i = K$ holds for $1 \leq i \leq n$, where K is certain constant, then the UEP code reduces to a conventional (N, K) error control code.

The following theorem states the relation among the error protection degrees ($L_i$'s) of the different symbols in a message.

Theorem 1: For a message M with n symbols, if there exists a UEP code such that the error protection degree of the i-th symbol in the original message M is $L_i (1 \leq i \leq n)$, then $\Sigma_{i=1}^{n} 1/L_i \leq 1$. Those skilled in the art will notice that above inequality is independent of the UEP codeword length N. Also when $L_i = K$ for $1 \leq i \leq n$, the above inequality is a form of the well known Singleton Bound.

The UEP codes provide an efficient means of delivering streaming data. For a streaming data with n symbols, the i-th symbol should be retrieved and (then played) out before the (i+1)-th symbol is delivered. This can be realized by using a UEP code: let the i-th symbol of the original streaming data to have an error protection degree of $L_i(1 \leq i \leq n)$, then $L_i \leq L_{i+1}$ for $1 \leq i \leq n-1$. The UEP code ensures the retrieval of the i-th symbol of the original data as long as any $L_i$ symbols of its codeword are received. Thus, when the UEP codeword (with N symbols) of a streaming data is being multicast to a group of end users, a new user can join the multicast group at any time during this multicast period. Then the new user can retrieve the i-th symbol of the original streaming data once $L_i$ symbols from the UEP codeword are received. In this manner, a single stream of the UEP encoded data enables multiple users to play out the original data from its beginning at any specific moment.

According to the invention, system 100 provides data streaming using a UEP code. First, the streaming data server 102 encodes an original data of n symbols, or units, into a UEP codeword of N symbols, or segments, such that the error protection degree of the i-th symbol of the original data is $L_i$ for $1 \leq i \leq n$. Upon the first request for the original data, server 102 continuously sends the stream of its UEP codeword to a multicast group of clients 104 via network 106. This multicast process ends only after all the users in the group finish receiving the data streaming.

A new user at client 104 requesting the original streaming data firsts asks server 102 for the multicast group identifier (usually the multicast IP address) of the corresponding encoded UEP stream. It then joins the multicast group, receives the UEP data stream symbols and stores them at its local buffer space 120. Once the number of data symbols in its buffer space 120 reaches $L_i$, client 104 retrieves (or decodes) the i-th symbol of the original data stream and plays it out via media destination, or data consumer, 122. The user leaves the multicast group when its data request is fulfilled.

It can be readily seen that the above scheme greatly reduces the load on server 102 inasmuch as server 102 multicasts a single encoded UEP data stream all the time, regardless of the number of clients 104 (i.e., the end users) requesting the original data. The network bandwidth consumption is reduced dramatically as well. If a normal play out of the original data uses a network, or base, bandwidth B, then the peak network bandwidth used for playing out the original streaming data at its original (normal) speed is $r_{peak}B$, where $r_{peak} = \max L_i/i$ for $1 \leq i \leq n-1$, and the average network bandwidth is $r_{ave}B$, where $r_{ave} = L_n/n$. Again, both the peak and the average network bandwidth are independent of the number of the end users. Thus, the present invention provides a natural scalability in terms of the number of users.

In addition, the UEP codes, by their very nature, tolerate some degree of data symbol loss during the transmission. The delivered data symbol of the present invention preferably carries a symbol index, which can be easily implemented using a conventional technique such as sequence numbers, so that the multicast channel need not be perfectly reliable. This greatly improves communication efficiency, since the cost of implementing a reliable multicast channel without data loss is extremely expensive.

In order to play out the first symbol of the original streaming data at the original (normal) speed, $L_1$ symbols of the same size are delivered from the UTP codeword stream within the same amount of time, thus the network bandwidth used for the first original data symbol is $L_1B$, where B is the base bandwidth for normal play-out. After the i-th original symbol is played out, $L_{i+1} - L_i$ additional UEP codeword symbols are delivered to play out the (i+1)-th original symbol, thus the network bandwidth used for a normal play out of the (i+1)-th original data symbol is $(L_{i+1} - L_i)B$ for $1 \leq i \leq n-1$. Thus, as described above, the present invention obtains the peak and the average network bandwidths for normal play out of the original data stream.

It is often desirable to have relatively constant network bandwidth consumption for delivering streaming data. If the original data is transmitted at a constant bit rate (CBR), i.e., all the original data symbols are of the same size, then for the UEP codeword stream if $L_{i+1}-L_i=b$ holds for $1 \leq i \leq n-1$, the network bandwidth for normal play out of the original data stream is constantly bB, where b is a constant. It is easy to see in this case that $L_i=(i-1)b+L_i$ for $1 \leq i \leq n$ is desired. Let $L_1=b+D$, then $L_i=ib+Db$ for $1 \leq i \leq n$. D is the additional initial delay of the playing out the first original data symbol measured in terms of the base bandwidth.

By Theorem 1, $$\frac{1}{b}\sum_{i=1}^{n} \frac{1}{i+D} \leq 1$$

Thus, the minimal b is the b which satisfies the equality above.

Let $H_1=\Sigma_{i=1}^{l} 1/i$, then the minimal network bandwidth for playing out the original data stream of n symbols at the original speed and an initial delay D is bB, where B is the base bandwidth and $b=H_{n+D}-H_D$. Theorem 2 follows:

$$1+\frac{1}{2}\log_2 l \leq H_l \leq 1+\log_2 l, \text{ thus } H_l \approx \alpha\log_2 l, \text{ where } \frac{1}{2} \leq \alpha \leq 1.$$

For a normal broadcast video with frame size 720×480 and 8 bits per pixel, its normal play out speed is 30 frames per second (fps) and the corresponding base network bandwidth B needed is 3 to 8 Mbps depending on data compression schemes used. If multicasting a UEP codeword stream of a two-hour movie according to a preferred embodiment of the invention, the original video data has 216,000 (=30×60×120) frames. Let the UEP codeword frame have the same size as the original video frame, and the additional initial delay of playing out the first frame of the original video is 0, then $b=H_{216000}-H_0 \approx 12.859$, i.e., a network bandwidth of 12.859B, or 38.577 Mbps to 102.872 Mbps, is used to play out the video at the original speed. However, if system 100 allows an additional delay of 30 seconds to play out the first frame, then $b=H_{216900}-H_{900} \approx 5.484$. Thus, the desired network bandwidth is 5.484B, i.e., 16.452Mbps to 43.872 Mbps. If system 100 further allows the additional initial delay to be 1 minute, then the desired network bandwidth is reduced to 4.796B, or 14.388 Mbps to 38.368 Mbps ($b=H_{217800}-H_{1800} \approx 4.796$). As such, the present invention provides an efficient and reliable scheme for applications such as true video-on-demand using the current cable broadcast networks.

If the original data is transmitted at a variable bit rate (VBR), adjusting the error protection degrees $L_i$'s in the UEP codeword maintains a constant rate of the UEP codeword stream. Thus, a constant network bandwidth consumption can still be maintained. Let the play out rate of i-th symbol of the original data be $R_i$, to maintain a constant rate of the UEP codeword stream, $$\frac{L_{i+1}-L_i}{R_{i+1}}=\beta, 1 \leq i \leq n$$

where the constant $\beta$ is the network bandwidth for the UEP codeword stream. For a given series of $R_i$'s, an optimal (minimal) $\beta$ can be obtained which satisfies the equality in Theorem 1.

Certain data symbols of the UEP codeword stream are preferably buffered at the user's storage space 120 before the original stream can be played out. A naive buffering scheme is simply to buffer all the $L_n$ symbols of the UEP codeword. However, in this case, for a CBR original stream, $L_n=b(n+D)=(H_{n+D}-H_D)(n+D)$. Thus if the original data stream length is M, then buffer space S is preferably $(1+D/n)(H_{n+D}-H_D)M$, or roughly $(H_{n+D}-H_D)M$. A two-hour video at 30 fps and frame size 720×480 usually needs 4 Gbytes storage space. If system 100 allows an additional delay of 60 seconds, about 19.2 Gbytes buffer space (using the above calculations) is desired. While this is feasible for some applications, it is too expensive for most applications.

Advantageously, the present invention provides for carrying a fraction of each symbol of the original data stream in each of the corresponding UEP codeword symbols. Once the i-th symbol of the original data stream is retrieved, the information related to this symbol carried in the subsequent UEP codeword symbols is preferably no longer buffered. Thus, buffer space can be reduced significantly.

The fraction $1/L_i$ of each UEP codeword symbol is related to the i-th original data symbol, thus the buffer space needed for retrieving the (i+1)-th original symbol after the retrieval of i-th original symbol is $$\left(1-\sum_{j=1}^{i} \frac{1}{L_j}\right)L_{i+1}$$

symbols. So for an original data stream of length M with n symbols, the buffer space needed is S, where $$S=\max\left\{\frac{M}{n}L_1, \frac{M}{n}\left(1-\sum_{j=1}^{i} \frac{1}{L_j}\right)L_{i+1}\right\}, 1 \leq i \leq n-1$$

For a CBR original data with n symbols, the following $L_i$'s minimize network bandwidth requirement: $L_i=(i+D)(H_{n+D}-H_D)$, where D is the additional initial delay in terms of data symbols:

$$y_i=\left(1-\sum_{j=1}^{i} \frac{1}{L_j}\right)L_{i+1},$$

$Y_i=(H_{n+D}-H_{i+D})(i+D+1)$

Let $z_i=H_{n+D}-H_{i+D}$, then the recursion of $y_i$'s and $z_i$'s follows for $2 \leq i \leq n-1$:

$$\begin{cases} y_{i-1}=y_i-z_i+1 \\ z_{i-1}=z_i+\frac{1}{i+D} \\ y_n=0 \\ z_n=0 \end{cases}$$

Using the above equations, the buffer space for an original data stream may be calculated. For example, if system 100 allows an additional initial delay of 60 seconds for a two-hour video of 4 Gbytes and 216000 frames, then n=216000 and D=1800, which yields S=1.484 Gbytes (about 37.095% of the original data length).

Buffer space for original VBR data can be calculated in a similar way once $L_i$'s are decided by the original data rates $R_i$'s.

As described above, the present invention provides data streaming using UBP codes. The scheme multicasts a UEP encoded codeword stream instead of the original data stream to a group of users. Server load and network bandwidth consumption are roughly $\alpha \log_2 n$ times of that for the original data, where $0.5 \leq \alpha \leq 1$, and n is the number of symbols (frames) of the original data. In addition to its high efficiency and high scalability, the scheme also inherently tolerates data loss during transmission. Thus, it can be directly applied over the top of an unreliable multicast media, which further reduces communication cost.

To summarize, the following table lists resources consumption of playing a two-hour video with 30 frames per second using the present invention. Network bandwidth and server load are normalized by the corresponding parameters of one unicast of the original data, while the buffer space is normalized by the original data size.

| Initial Delay (Seconds) | 0 | 1 | 30 | 60 |
|---|---|---|---|---|
| Normalized Network Bandwidth | 12.859 | 8.87 | 5.484 | 4.796 |
| Normalized Server Load | 12.859 | 8.87 | 5.484 | 4.796 |
| Normalized User Buffer Space | 36.788% | 36.790% | 36.941% | 37.095% |

When introducing elements of the present invention or the preferred embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method of distributing streaming media to one or more users, said media comprising a plurality of successive data units having a predefined order, said method comprising the steps of:
   partitioning the media into a plurality of segments, each segment including data associated with at least a portion of one or more of the data units, each segment further including information for positioning the data relative to the order of the data units;
   defining a transmission sequence for the segments having a plurality of successive time slots, said sequence enabling reconstruction of an i-th data unit from $L_i$ segments;
   transmitting the segments according to the transmission sequence, each segment being transmitted during one of the time slots; and
   processing the transmitted segments based on the positioning information to reconstruct the media.

2. The method of claim 1 wherein the data associated with the i-th data unit is transmitted at least every $L_i=(d+bi)$ segments, where d is a delay measured in segments and b is a bandwidth factor.

3. The method of claim 2 wherein the bandwidth factor b is a function of the delay d and a user storage space S.

4. The method of claim 1 further comprising the step of asynchronously playing out the reconstructed media in response to a command from the user.

5. The method of claim 4 wherein the step of playing out the reconstructed media includes returning to an earlier data unit of the reconstructed media in response to another command from the user.

6. The method of claim 4 further comprising the step of delaying the playing step for a period of d segments following the command.

7. The method of claim 1 further comprising the step of partitioning each data unit into one or more subunits, said data unit partitioning step including partitioning the i-th data unit into $m_i$ subunits, where $i \geq 1$ and $m_i \geq 1$.

8. The method of claim 7 wherein the step of defining the transmission sequence includes assigning data associated with at least one subunit of each data unit to each of the segments.

9. The method of claim 1 further comprising the step of storing the segments for subsequent retrieval of the data associated with the data units according to the order of the data units.

10. The method of claim 9 wherein the processing step includes retrieving selected stored segments for use in reconstructing one or more of the data units from the retrieved segments and further comprising the step of playing out the reconstructed media beginning with a data unit selected by the user.

11. The method of claim 1 wherein the transmitting step includes transmitting at least a portion of one or more segments via multiple transmission channels, the data transmitted via at least one of the multiple channels differing from the data transmitted via another one of the channels.

12. The method of claim 11 wherein different segments are transmitted via each channel.

13. The method of claim 1 further comprising the step of executing a smoothing algorithm to adjust the transmission sequence to more evenly distribute the amount of data transmitted during each time slot.

14. The method of claim 1 further comprising the step of encoding the segments according to an error control code to provide error protection against segment loss and/or corruption.

15. A method of distributing streaming media to one or more users, said media comprising a plurality of successive data units having a predefined order, said method comprising the steps of:
   partitioning the media into a plurality of segments, each segment including data associated with at least a portion of one or more of the data units, each segment further including information for positioning the data relative to the order of the data units;
   defining a transmission sequence for the segments having a plurality of successive time slots, said transmission sequence including data associated with an i-th data unit at least every $L_i$ time slots;
   transmitting the segments according to the transmission sequence, each segment being transmitted during one of the time slots; and
   processing the transmitted segments based on the positioning information to reconstruct the media.

16. The method of claim 15 further comprising the step of asynchronously playing out the reconstructed media in response to a command from the user.

17. The method of claim 16 further comprising the step of delaying the playing step for a period of d segments following the command.

18. The method of claim 16 wherein the step of playing out the reconstructed media includes returning to an earlier data unit of the reconstructed media in response to another command from the user.

19. The method of claim 15 wherein the transmitting step includes transmitting at least a portion of one or more segments via multiple transmission channels, the data transmitted via at least one of the multiple channels differing from the data transmitted via another one of the channels.

20. The method of claim 19 wherein different segments are transmitted via each channel.

21. The method of claim 15 wherein the transmission sequence enables reconstruction of the i-th data unit from at least $L_i$ segments, where $L_i=(d+bi)$, d is a delay measured in segments, and b is a bandwidth factor.

22. The method of claim 15 further comprising the step of storing the segments for subsequent retrieval of the data associated with the data units according to the order of the data units.

23. The method of claim 15 further comprising the step of executing a smoothing algorithm to adjust the transmission sequence to more evenly distribute the amount of data transmitted during each time slot.

24. A method of distributing streaming media to one or more users, said media comprising a plurality of successive data units having a predefined order, said method comprising the steps of:

partitioning each data unit into one or more subunits, said data unit partitioning step including partitioning an i-th data unit into $m_i$ subunits, where $i \geq 1$ and $m_i \geq 1$;

assigning data associated with at least one subunit of each data unit to each of a plurality of segments, each segment including data associated with at least a portion of one or more of the data units, each segment further including information for positioning the data relative to the order of the data units;

defining a transmission sequence for the segments having a plurality of successive time slots, said sequence enabling reconstruction of the i-th data unit from $L_i$ segments;

transmitting the segments according to the transmission sequence, each segment being transmitted during one of the time slots; and processing the transmitted segments based on the positioning information to reconstruct the media.

25. The method of claim 24 further comprising the step of asynchronously playing out the reconstructed media in response to a command from the user.

26. The method of claim 25 wherein the step of playing out the reconstructed media includes returning to an earlier data unit of the reconstructed media in response to another command from the user.

27. The method of claim 24 wherein the transmitting step includes transmitting at least a portion of one or more segments via multiple transmission channels, the data transmitted via at least one of the multiple channels differing from the data transmitted via another one of the channels.

28. The method of claim 27 wherein different segments are transmitted via each channel.

29. The method of claim 24 wherein the data associated with each subunit of the i-th data unit is transmitted at least every $L_i=(d+bi)$ time slots, where d is a delay measured in segments and b is a bandwidth factor.

30. The method of claim 24 further comprising the step of storing the segments for subsequent retrieval of the data associated with the data units according to the order of the data units.

31. The method of claim 24 further comprising the step of encoding the segments according to an error control code to provide error protection against segment loss and/or corruption.

* * * * *